April 6, 1926.
G. E. HALLENBECK
CLUTCH
Filed Oct. 6, 1921
1,579,359
2 Sheets-Sheet 1
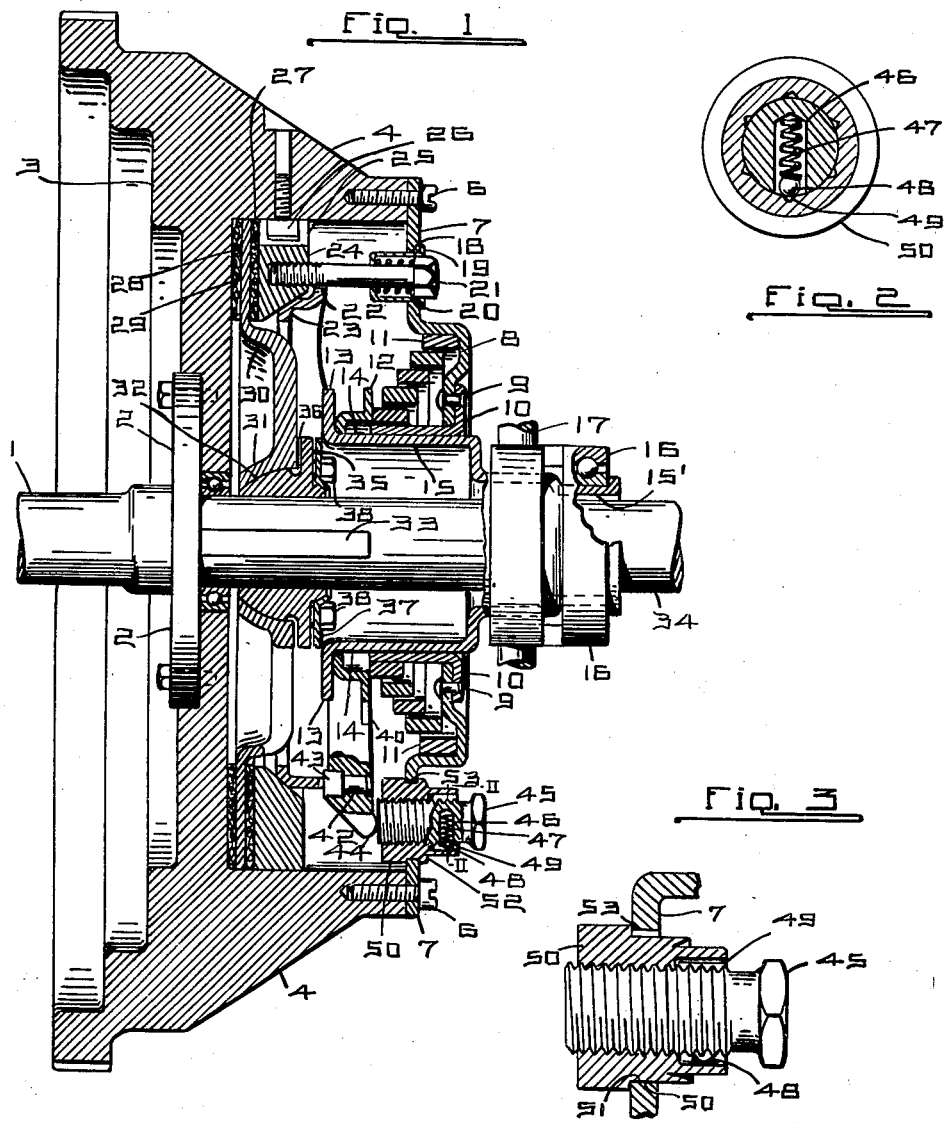
INVENTOR
BY
ATTORNEY April 6, 1926.  G. E. HALLENBECK  1,579,359
CLUTCH
Filed Oct. 6, 1921   2 Sheets-Sheet 2
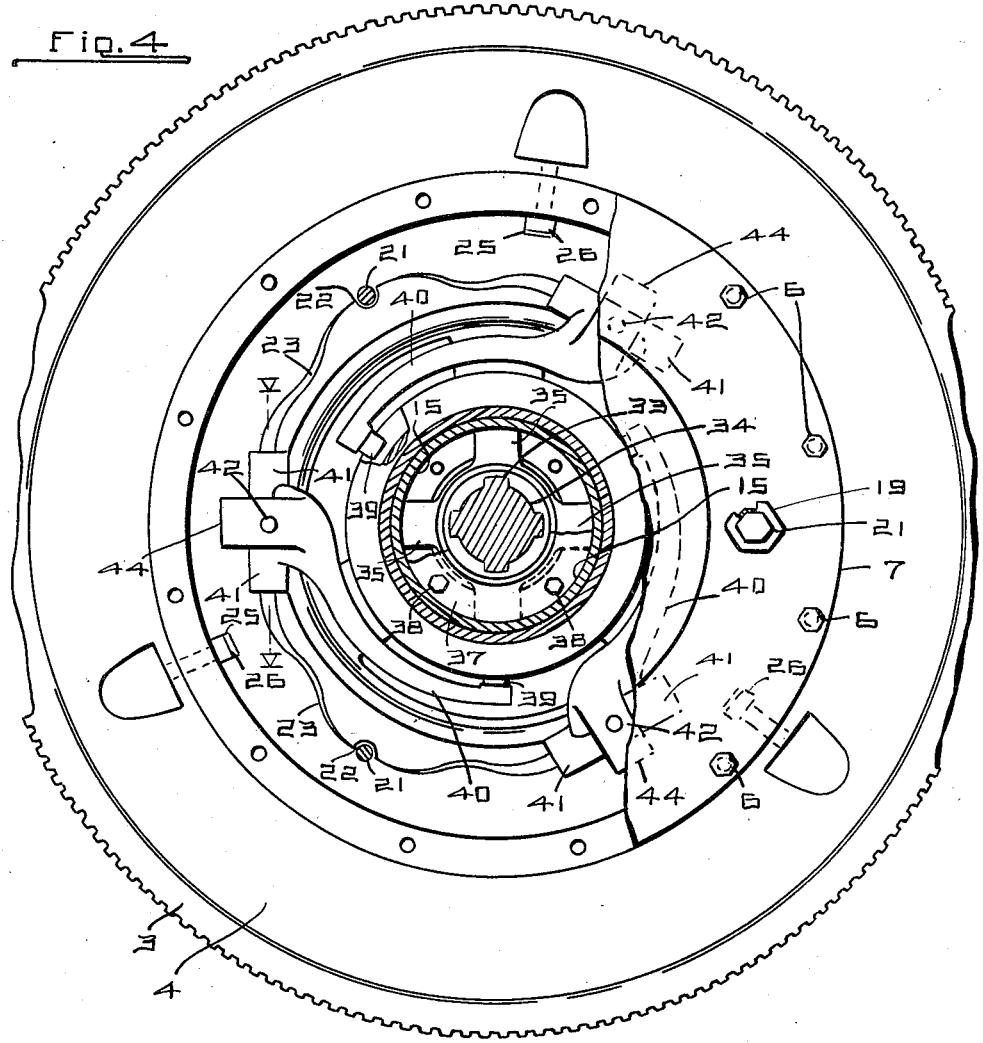
Fig. 4
Fig. 5
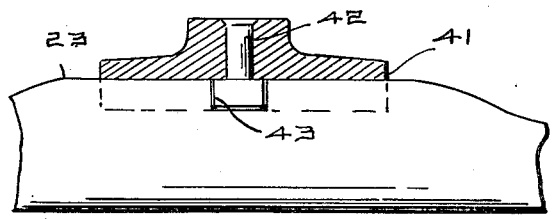
Geo. E. Hallenbeck
INVENTOR
BY
Geo. E. Kirk
ATTORNEY Patented Apr. 6, 1926.

1,579,359

UNITED STATES PATENT OFFICE.

GEORGE E. HALLENBECK, OF TOLEDO, OHIO, ASSIGNOR TO CHARLES B. ROSE, OF KENT, OHIO.

CLUTCH.

Application filed October 6, 1921. Serial No. 505,689.

*To all whom it may concern:*

Be it known that I, GEORGE E. HALLENBECK, a citizen of the United States of America, residing at Toledo, Lucas County, Ohio, have invented new and useful Clutches, of which the following is a specification.

The invention relates to clutches.

It relates particularly to a clutch for automotive vehicles.

It is an improvement on the clutch of Patent 1,507,518, Sept. 2, 1924, to C. B. Rose and it has been devised for the purpose of simplifying the construction of the clutch of said patent so that it can be economically produced. In order to accomplish this the construction has been made such that many of the parts can be made as sheet metal stampings.

The general object of the invention is to provide an improved clutch.

A more particular object is to provide a clutch which may be economically produced and assembled.

Other objects and advantages of the invention will hereinafter appear.

Referring to the drawings:

Fig. 1 is a section of an embodiment of the invention in a flywheel type of clutch structure;

Fig. 2 is a section on the line II—II, Fig. 1;

Fig. 3 is a detail view showing a mounting of the abutting device for the levers of the clutch;

Fig. 4 is a side elevation of the general clutch structure of Fig. 1, parts being broken away; and Fig. 5 is a section on the line V—V, Fig. 4.

The clutch is illustrated in connection with the driving shaft 1 of a motor on which is a flange 2 carrying a fly wheel 3. The major portion of the clutch mechanism is housed in a recess in the rear face of the fly wheel, which recess is enclosed by the annular wall 4 of the fly wheel and by a cover or back plate 7 bolted to the wall 4 by the bolts 6. The cover plate is a metal stamping which has an offset portion 8 toward its center to receive a clutch operating spring 50 as will be later described.

Riveted to the cover plate by rivets 9 is a second metal stamping forming a cylindrical sleeve or bearing 10.

Mounted in the recess formed by the offset portion 8 of the cover plate 7 is a spiral clutch spring 11 which bears at its rear end against the cover plate and at its forward end against a flange on a collar 12. This collar is a metal stamping and it surrounds a sleeve 15 having a flange 13 against which the collar 12 is thrust by the clutch operating spring 11. There is a space 14 between the flange on the collar 12 and the end of the bearing 10 which allows a limited longitudinal movement of the collar 12 in a manner and for a purpose to be explained later.

The sleeve 15 is slidably carried by the bearing member 10 and it has a rear extension 15' of smaller diameter than the main portion. Mounted on this rear extension is a thrust bearing 16 which may be moved rearwardly by an operating means 17 which, in the case of an automotive vehicle, is the clutch throw-out lever and associated parts. The rear end of the extension 15' is flanged to hold the bearing in place and so that, as it is moved rearwardly, it carries the sleeve 15 with it which also carries the collar 12 rearwardly and thereby compresses the spiral spring 11 to disconnect the clutch.

The cover plate 7 is provided with a plurality of openings 18 in which are mounted inwardly extending socket members 19 forming hexagonal pockets which serve to house springs 20 bearing against the hexagonal heads of bolts 21. The springs normally bias these bolts outwardly. The shape of the sockets prevents the bolts from rotating. The bolts extend inwardly and pass through notches 22 in a self-aligning ring 23 which has a spherical surface bearing against a complementary surface on a pressure ring 24. The bolts 21 are screw threaded into this pressure ring and the action of the springs 20 in pressing outwardly on the heads of the bolts tends to pull the pressure ring 24 outwardly against the self-aligning ring 23. The pressure ring is prevented from rotating relative to the clutch housing by bolts 26 engaging in notches 25 in the pressure ring 24.

The pressure ring 24 bears against a friction ring or plate 27 which in turn bears against a disk 30 carried by the shaft to be driven. A second friction ring or plate 29 is positioned between the member 30 and the face 28 of the flywheel.

The driven disk 30 has a spherical center bearing which is mounted upon a complementary spherical bearing member 32 keyed or splined to a driven shaft 34 at 33. The bearing 32 is provided with radial arms 35 positioned in notches 36 in the hub of the disk 30. A clamping ring 37 held in position by bolts 38 holds the arms 35 loosely in the notches. The disk 30 is thus held in driving connection with the bearing 32 but is left free to adjust itself to compensate for inequalities in alignment between shafts 1 and 34.

A plurality of operating or actuating levers 40 are provided, each of which has a trunnion 39 positioned in an annular recess between the flange 13 and the flange on the collar 12. The shape of these levers and their position relative to the other parts of the clutch are illustrated in Figure 4. The outer end of each lever has a transverse head 41 in which is positioned a hardened pin 42 having an enlarged end 43 which contacts a slot in the self-aligning ring 23. The hardened pin prevents undue wear on the actuating arm and the engagement of the pin in the notch in ring 23 prevents the lever from shifting transversely around the ring. The head 43 of the pin 42 has a rocking contact with the ring 23 as will be later described. The outer ends of the levers have contact portions 44 which abut with rolling contact against adjustable stops or fulcrums 45. Each of the adjustable stops 45 comprises a stud which is screw-threaded into a bushing 50. The stop is adjusted by turning the stud in the bushing. Each stud has a recess 46 in which is mounted a spring 47 bearing against a ball 48 to force it to seat itself in small recesses in the bushing 50. The spring pressed ball serves to hold the stud against being turned by the jar and motion of the clutch when in operation. It does this without interfering with the quick adjustment of the stud. In fact, it serves as a means of gauging the adjustment that is being made because, when the stud is turned, the entry of the ball into the notches will be felt by the person making the adjustment. He can thus determine just how many notches forward or backward the stud is being turned.

The bushings 50 are mounted in openings 51 in the cover plate 7. This mounting is a simple, efficient, and economical one. Each bushing 50 has a shoulder which contacts one side of the cover plate. The body of the bushing extends through the opening and it is provided with a second shoulder 52 as illustrated in Figures 1 and 3. The openings 51 are provided with locking recesses 53 which are simply small slots in the edge of the circular openings 51. The bushing 50 is inserted through the opening 51 and the shoulder 52 is then pressed downwardly to force the metal against the plate and to force some of it into the recesses 53. This locks the bushing on to the cover plate 7 and the metal that is pushed into the slot 53 prevents the bushing from rotating.

The clutch operates as follows.

The spring 11 normally forces the collar 12 against the sleeve 15 which forces the inner ends of the actuating levers 40 to the left as viewed in Fig. 1. The ends of these levers are fulcrumed on the adjustable stops 45 and consequently the heads 43 of the pins 42 carried by the actuating levers are pressed against the self-aligning ring 23. This ring in turn bears against the pressure ring 24 which in turn bears against the friction ring 27 and the parts are held in clutching engagement. When in this position all the parts are rotating together.

When it is desired to disengage the clutch the operating mechanism 17 is moved to force the throwout bearing 16 to the right as viewed in Figure 1. This moves the sleeve 15 to the right against the force of the clutch spring 11. As the sleeve 15 moves to the right the inner ends of the actuating levers 40 are likewise moved to the right and the pressure of the heads 43 of the pins 42 on the self-aligning ring 23 is relieved. The springs 20 press against the heads of the bolts 21, then pull the pressure ring 24 away from the friction ring 27. This relieves the pressure and the flywheel is free to rotate relative to the disk 30. When the parts are in this position, the flywheel together with the cover plate, the clutch spring, the actuating levers, the self-aligning ring, and the pressure ring are rotating, but the disk 30 with its bearings and the shaft 34 remain stationary. When the pressure ring 24 is retracted, it is pulled against the self-aligning ring 23 which prevents chattering of these parts. Whenever pressure on the clutch throw-out pedal is released the operating spring 11 is sufficiently strong to force the parts into clutching engagement against the pressure of the springs 20.

It will be observed that the disk 30 is mounted so as to be free to adjust itself to inequalities in the alignment of the shafts and such other inequalities as may develop. Also, the self-aligning ring 23 is free to adjust itself to inequalities in wear or in the adjustment of the fulcrums 45. The rocking bearing of the levers on the fulcrums 45 and of the pins 42—43 on the self-aligning ring 23 gives an efficient contact that has a long life without requiring frequent lubrication.

One of the difficulties with disk clutches is the adjustment required to take care of the wear of the parts. Most of these clutches have three or more operating levers and the clutches are adjusted to compensate for wear on the friction rings by varying the effective throw of the levers by adjusting fulcrums in some way. It is difficult to adjust each fulcrum the same amount, if they are adjusted independently. Some of them require more adjustment than others owing to the fact that the wear is greater at some points than at others, but it is almost impossible to determine which needs the greater or lesser adjustment. Some clutches are provided with adjusting rings which simultaneously adjust all three levers the same amount. This is not satisfactory in cases where one lever needs more adjustment than the other. In the present clutch, the fulcrum of each lever is adjusted independently by a quick and easy adjustment. This adjustment should be as accurate as it is reasonably possible to make it but the important feature is that if the adjustment is inaccurate, and it generally is more or less inaccurate, the construction of the clutch is such that it automatically takes care of the inequalities. The self-aligning ring 23 adjusts itself to compensate for the inequalities in the adjustment of the fulcrums.

One of the features disclosed is the lightness, the strength and the low production costs that are obtained by making the parts of sheet metal stampings. The cover plate and the sleeve 10 are thus constructed. The collar 12 and the sleeve 15 are likewise sheet metal parts. The self-aligning ring is a sheet metal stamping. The actuating levers are drop forged. The bearing 16 is simply and economically mounted on the sleeve 15. The fulcrums 45 are quickly and economically mounted in the cover plate. The sleeves 18 for receiving the heads of the bolts 21 are sheet metal stampings.

These parts are quickly and easily assembled together as follows:

The clutch spring 11, the collar 12 and the sleeve 15 are mounted in the bearing 10 on the cover plate 7. The actuating levers, the self-aligning ring 23 and the pressure ring 24 are then put in position and the spring 11 is compressed while the bolts 21 are threaded into the pressure ring 24. When pressure on the spring 11 is released, the bolts 21 hold the parts together as a unit. The bearing 16 may be assembled on the sleeve 15 either before or after the parts are put together, preferably before.

The disk 30 and the friction rings 27 and 28 are mounted in the recesses in the fly wheel after which the unit, including the cover plate, may be bolted in position. The shaft 34 which is usually splined into the bearing 32 can then be inserted.

The unit construction above explained facilitates taking the clutch apart for repairs. Ordinarily when a clutch of this type is taken apart the pressure of the heavy spring 11 scatters the clutch apart as soon as the bolts holding the cover plate are removed. In the present case, such action does not take place. When the bolts are removed, the cover plate and associated parts come out as a unit but are not thrown apart by the pressure of the spring because the bolts 21 hold the parts together against the pressure of the spring.

The quick adjustment of the fulcrums 45 with the self-locking feature makes it easy and convenient to adjust the clutch. The self-aligning feature contributes to this ease by making it unnecessary to have the adjustment absolutely accurate.

It is to be understood that the structure shown is for purposes of illustration and that variations may be made in it without departing from the spirit and scope of the invention.

What is claimed and it is desired to secure by Letters Patent is:

1. In a clutch, a sheet metal back plate, a sheet metal sleeve attached thereto and extending inwardly near the center of the plate, a second sheet metal sleeve slidably mounted in the first and having a flange on its inner end, a sheet metal collar surrounding the second sleeve, a clutch spring between the collar and the back plate, and clutch operating arms having portions mounted between the collar and the flange on the second sleeve.

2. In a clutch, a sheet metal back plate, a sheet metal sleeve carried by the plate and extending inwardly near its center, a second sleeve slidably mounted in the first and having a flange on its inner end, a collar surrounding the second sleeve, a spring between the collar and the back plate, operating arms having portions mounted between the collar and the flange on the second sleeve, fulcrums carried by the back plate and engaged by said arms, a pressure ring, and a stamped metal self-aligning ring between the pressure ring and the arms.

3. In a clutch, a plurality of operating arms, a back plate having a plurality of openings therethrough, and a plurality of fulcrums for said arms mounted in said openings, each of said fulcrums having a pair of shoulders with one shoulder swaged toward the other for engaging the back plate between them to hold the fulcrum in position.

4. In a clutch, a plurality of operating arms, a back plate having a plurality of openings therethrough each provided with a notch in its periphery, and a plurality of fulcrums for said arms mounted in said openings, each of said fulcrum having a pair of shoulders with one shoulder swaged toward the other for engaging the back plate between them and for filling the notches in the periphery of the openings to hold the fulcrums in position.

In witness whereof I affix my signature.

GEORGE E. HALLENBECK.